US012645489B2

(12) United States Patent
Park et al.

(10) Patent No.: US 12,645,489 B2
(45) Date of Patent: Jun. 2, 2026

(54) METHOD FOR ROBOTIC PROCESS AUTOMATION, APPARATUS AND SYSTEM FOR EXECUTING THE METHOD

(71) Applicant: SAMSUNG SDS CO., LTD., Seoul (KR)

(72) Inventors: Koohyun Park, Seoul (KR); Jae Cheol Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 537 days.

(21) Appl. No.: 17/976,214

(22) Filed: Oct. 28, 2022

(65) Prior Publication Data

US 2023/0137386 A1      May 4, 2023

(30) Foreign Application Priority Data

Oct. 29, 2021      (KR) ........................ 10-2021-0146940

(51) Int. Cl.
G06F 9/48         (2006.01)
G06F 3/14         (2006.01)
(Continued)

(52) U.S. Cl.
CPC .............. G06F 9/48 (2013.01); G06F 3/1454 (2013.01); G06F 8/30 (2013.01); G06F 9/44521 (2013.01);
(Continued)

(58) Field of Classification Search
CPC ... G06F 9/48; G06F 9/452; G06F 8/30; G06F 9/45512; G06F 3/1454; G06F 9/44521;
(Continued)

(56) References Cited

U.S. PATENT DOCUMENTS

| | | | | |
|---|---|---|---|---|
| 8,819,241 | B1* | 8/2014 | Washburn | ........... H04L 67/1097 709/216 |
| 11,893,403 | B1* | 2/2024 | Gu | ...................... G06F 9/45558 |
| 2007/0274400 | A1* | 11/2007 | Murai | .............. H04N 21/25808 375/240.26 |
| 2011/0242267 | A1* | 10/2011 | Woo | ...................... H04N 7/147 348/14.02 |

(Continued)

FOREIGN PATENT DOCUMENTS

| | | |
|---|---|---|
| JP | 2020-17099 A | 1/2020 |
| KR | 10-2014-0004495 A | 1/2014 |

(Continued)

OTHER PUBLICATIONS

Office Action issued Sep. 8, 2025 by the Korean Patent Office for KR Patent Application No. 10-2021-0146940.

*Primary Examiner* — Charles M Swift
(74) *Attorney, Agent, or Firm* — Sughrue Mion, PLLC

(57)      ABSTRACT

Disclosed are a method for robotic processing automation. The method for robotic processing automation includes transmitting to a remote apparatus, a screen stream request for a target program executed in the remote apparatus, receiving from the remote apparatus, a screen stream corresponding to the screen stream request and displaying the screen stream corresponding to the screen stream request, monitoring whether a user event occurs in the displayed screen stream, transmitting to the remote apparatus, when the user event occurs, an information inquiry request for an object related to the user event, receiving from the remote apparatus, object-related information corresponding to the information inquiry request, and generating an automation script for automatically executing the target program based on at least one of the screen stream or the object-related information.

18 Claims, 7 Drawing Sheets

(51) Int. Cl.

| | |
|---|---|
| *G06F 8/30* | (2018.01) |
| *G06F 9/445* | (2018.01) |
| *G06F 9/451* | (2018.01) |
| *G06F 9/455* | (2018.01) |
| *G06F 9/54* | (2006.01) |

(52) U.S. Cl.
CPC .......... *G06F 9/44568* (2013.01); *G06F 9/452* (2018.02); *G06F 9/45512* (2013.01); *G06F 9/541* (2013.01); *G06F 9/542* (2013.01); *G06F 9/547* (2013.01)

(58) Field of Classification Search
CPC ...... G06F 9/44568; G06F 9/541; G06F 9/542; G06F 9/547
See application file for complete search history.

(56) References Cited

U.S. PATENT DOCUMENTS

| | | | | |
|---|---|---|---|---|
| 2013/0041578 | A1* | 2/2013 | Aono | G01C 21/26 |
| | | | | 701/300 |
| 2013/0113738 | A1* | 5/2013 | Lee | G06F 3/0488 |
| | | | | 345/173 |
| 2018/0069847 | A1* | 3/2018 | Potnuru | H04L 63/08 |
| 2022/0197669 | A1* | 6/2022 | Xu | G06F 9/452 |

FOREIGN PATENT DOCUMENTS

| | | | |
|---|---|---|---|
| KR | 10-1635054 | B1 | 7/2016 |
| KR | 10-2016-0100094 | A | 8/2016 |
| KR | 10-2017-0047605 | A | 5/2017 |
| KR | 10-2018-0131132 | A | 12/2018 |

* cited by examiner

<u>100</u>

102
ROBOTIC
PROCESSING
AUTOMATION
APPARATUS

150
COMMUNICATION
NETWORK

104
REMOTE
APPARATUS

<u>102</u>

113

ROBOTIC PROCESSING AUTOMATION APPARATUS

REMOTE APPARATUS

Figure 7:
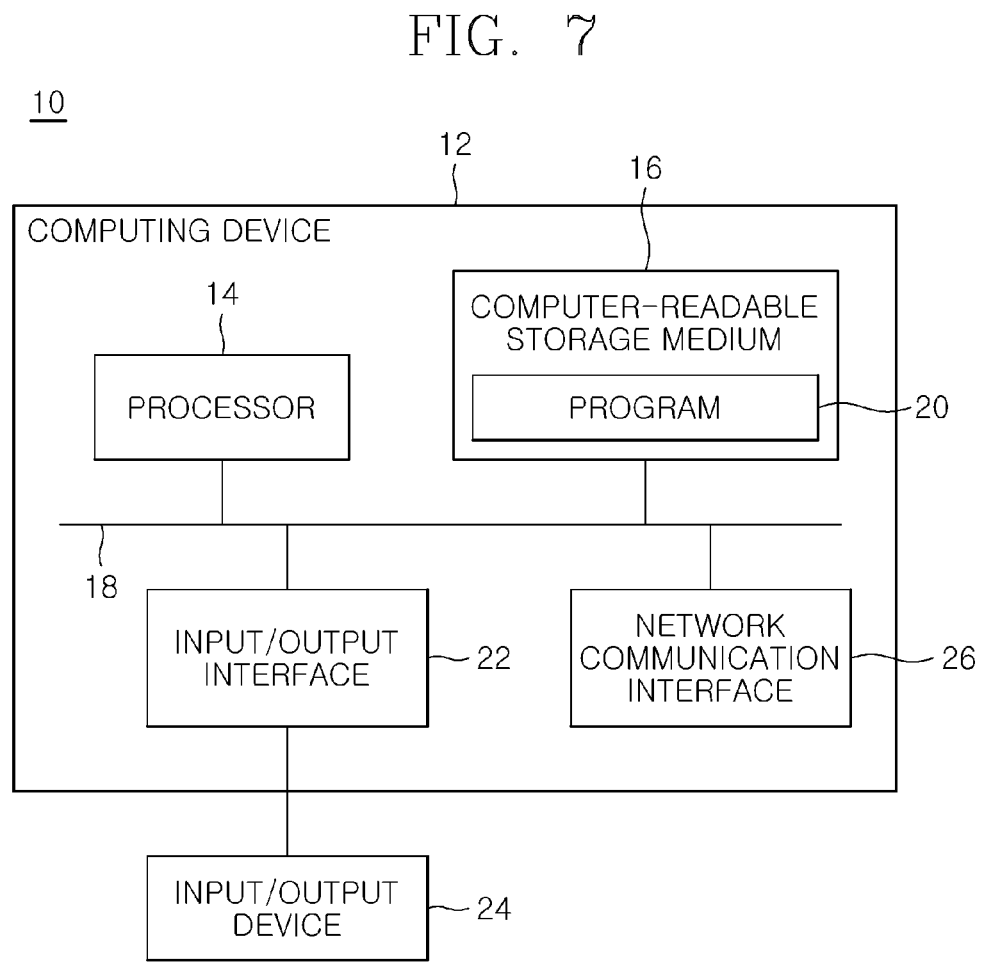

COMPUTING DEVICE — 12

16

COMPUTER-READABLE
STORAGE MEDIUM

14

PROCESSOR

PROGRAM — 20

18

INPUT/OUTPUT
INTERFACE — 22

NETWORK
COMMUNICATION
INTERFACE — 26

INPUT/OUTPUT
DEVICE — 24

METHOD FOR ROBOTIC PROCESS AUTOMATION, APPARATUS AND SYSTEM FOR EXECUTING THE METHOD

CROSS-REFERENCE TO RELATED APPLICATIONS

This application claims priority to Korean Patent Application No. 10-2021-0146940 filed on Oct. 29, 2021 in Korean Intellectual Property Office, the entire contents of which is hereby incorporated by reference in its entirety.

BACKGROUND OF THE INVENTION

1. Field of the Invention

The disclosed embodiments relate to robotic processing automation technology.

2. Description of the Prior Art

Robotic processing automation (RPA) refers to a technology that automates repetitive tasks that humans do with computers through robot software. The RPA includes software that designs rules to perform operations such as reception and transmission of e-mail, data recording and re-entry, etc., and provides a function to execute the operations.

Conventionally, in order to automate tasks executed on a personal computer (PC), it was necessary to install an RPA program on the PC and create an automation scenario by capturing information of a graphical user interface (GUI) object of a target application to be automated through a designer.

In the case of automating a task performed in a remote apparatus through the conventional RPA, there is a problem in that automation cannot be performed with respect to an application in an environment in which a designer cannot be installed. In addition, since it is necessary to develop an automation scenario only with the captured image and coordinate information of the remote apparatus, it is impossible to perform automation when the location of the GUI object to be automated is changed, and an optical character recognition (OCR) technology must be used for an operation of reading text by processing information of the remote apparatus as an image.

SUMMARY OF THE INVENTION

The present disclosure has been made in order to solve the above-mentioned problems in the prior art and an aspect of the disclosure is to provide a method for robotic processing automation that enables a program installed in a remote apparatus to develop an object information-based automation scenario, and an apparatus and system for performing the same.

In accordance with an aspect of the present disclosure, there is provided a method for robotic processing automation according to an embodiment that is performed in a computing device including one or more processors and a memory for storing one or more programs executed by the one or more processors, the method for robotic processing automation including transmitting to a remote apparatus, a screen stream request for a target program executed in the remote apparatus; receiving from the remote apparatus, a screen stream corresponding to the screen stream request and displaying the screen stream corresponding to the screen stream request; monitoring whether a user event occurs in the displayed screen stream; transmitting to the remote apparatus, when the user event occurs, an information inquiry request for an object related to the user event; receiving from the remote apparatus, object-related information corresponding to the information inquiry request; and generating an automation script for automatically executing the target program based on at least one of the screen stream or the object-related information.

The displaying the screen stream may include displaying the screen stream through a remote terminal screen in a screen of the computing device.

The monitoring may include determining that the user event has occurred when there is a user input for selecting an object within the screen stream displayed on the remote terminal screen.

The method for robotic processing automation may further include inserting coordinate information on the selected object, into the information inquiry request.

The inserting the coordinate information on the selected object, into the information inquiry request may include extracting coordinates of the selected object, from the screen of the computing device; converting the extracted coordinates of the selected object into relative coordinates on the remote terminal screen; and converting the converted coordinates into coordinates on the screen of the remote apparatus.

The converting the converted coordinates may include converting the converted coordinates into the coordinates on the screen of the remote apparatus based on a ratio between a resolution of the remote terminal screen and a resolution of the screen of the remote apparatus.

The object-related information may include at least one of an object ID, an object name, an object type, an object hierarchy, an object image size, an object location, or an object URL of the selected object.

The method for robotic processing automation may further include transmitting to the remote apparatus, a remote execution request including the automation script; and receiving from the remote apparatus, an execution result of the automation script.

The screen stream may be obtained by converting a screen of the target program of the remote apparatus into a video stream.

In accordance with another aspect of the present disclosure, there is provided a robotic processing automation apparatus including a processor, wherein the processor is configured to perform operations of: transmitting to a remote apparatus, a screen stream request for a target program executed in the remote apparatus, receiving from the remote apparatus, a screen stream corresponding to the screen stream request, and displaying the screen stream corresponding to the screen stream request; and transmitting to the remote apparatus, when a user event occurs in the displayed screen stream, an information inquiry request for an object related to the user event, receiving from the remote apparatus, object-related information corresponding to the information inquiry request, and generating an automation script for automatically executing the target program based on at least one of the screen stream or the object-related information.

The operation of displaying the screen stream may include displaying the screen stream through a remote terminal screen in a screen of the robotic processing automation apparatus.

The operation of generating the automation script may include determining that the user event has occurred when there is a user input for selecting an object within the screen stream displayed on the remote terminal screen.

The operation of generating the automation script may include inserting coordinate information on the selected object into the information inquiry request.

The operation of generating the automation script may include extracting coordinates of the selected object from the screen of the robotic processing automation apparatus, converting the extracted coordinates of the selected object into relative coordinates on the remote terminal screen, and converting the converted coordinates into coordinates on the screen of the remote apparatus.

The operation of converting the converted coordinates includes converting the converted coordinates into the coordinates on the screen of the remote apparatus based on a ratio between a resolution of the remote terminal screen and a resolution of the screen of the remote apparatus.

The object-related information may include at least one of an object ID, an object name, an object type, an object hierarchy, an object image size, an object location, or an object URL of the object selected by the user input.

The processor is further configured to perform an operation of: transmitting to the remote apparatus, a remote execution request including the automation script, and receiving from the remote apparatus, an execution result of the automation script.

In accordance with another aspect of the present disclosure, there is provided a robotic processing automation system including a robotic processing automation apparatus configured to: transmit a screen stream request for a target program, receive and display a screen stream corresponding to the screen stream request, transmit, when a user event occurs in the displayed screen stream, an information inquiry request for an object related to the user event, receive object-related information corresponding to the information inquiry request, and generate an automation script for automatically executing the target program based on at least one of the screen stream or the object-related information; and a remote apparatus configured to: convert an execution screen of the target program into a video stream in response to the screen stream request and transmit the converted screen stream to the robotic processing automation apparatus, receive the information inquiry request to detect an object corresponding to the information inquiry request, extract object-related information on the object to transmit the extracted object-related information to the robotic processing automation apparatus.

The robotic processing automation apparatus may transmit to the remote apparatus, a remote execution request including the automation script, and may receive from the remote apparatus, an execution result of the automation script.

BRIEF DESCRIPTION OF THE DRAWINGS

The above and other aspects, features, and advantages of the present disclosure will be more apparent from the following detailed description taken in conjunction with the accompanying drawings, in which:

FIG. 6 is a flowchart illustrating a method for robotic processing automation according to an embodiment of the disclosure; and FIG. 7 is a block diagram illustrating a computing environment including a computing device suitable for use in exemplary embodiments.

DETAILED DESCRIPTION OF THE EXEMPLARY EMBODIMENTS

Hereinafter, specific embodiments of the disclosure will be described with reference to the drawings. The following detailed description is provided to provide a comprehensive understanding of the methods, apparatus, and/or systems described herein. However, this is merely an example and the disclosure is not limited thereto.

In descriptions of embodiments of the disclosure, when it is determined that detailed descriptions of related well-known technology unnecessarily obscure the gist of the disclosure, the detailed descriptions will be omitted. Terms described below are defined by considering functions in the disclosure and meanings may vary depending on, for example, a user or operator's intentions or customs. Therefore, the definition should be made based on the content throughout this specification. The terminology used in the detailed description is for the purpose of describing embodiments of the present invention only, and should in no way be limiting. Unless explicitly used otherwise, expressions in the singular include the meaning of the plural. In this description, expressions such as "comprising" or "including" are intended to indicate certain features, numbers, steps, acts, elements, some or a combination thereof, and it should not be construed to exclude the presence or possibility of one or more other characteristics, numbers, steps, acts, elements, or any or any combination thereof other than those described.

In the following description, the terms "transmission", "communication", "reception" and other similar meanings of signals or information are not only directly transmitted from one component to another component, but also transmitted via other components. In particular, "transmitting" a signal or information to a component indicates the final destination of the signal or information and does not imply a direct destination. The same is true for "reception" of a signal or information. In addition, in this specification, when two or more data or information are "related", it means that when one data (or information) is acquired, at least a part of other data (or information) can be acquired based thereon.

Figure 1:
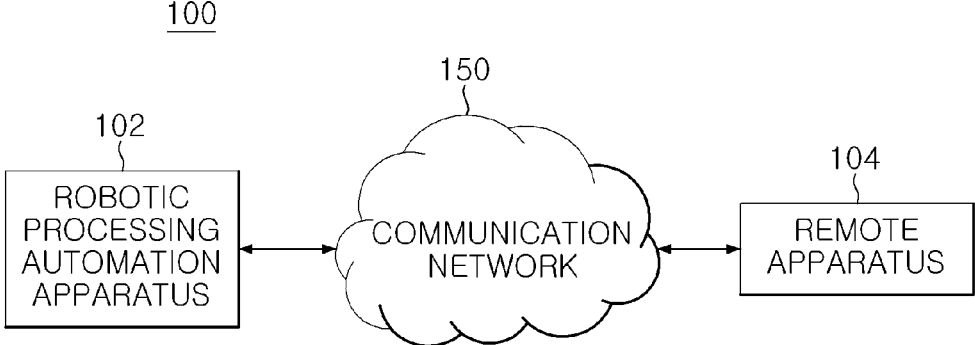
FIG. 1 is a diagram illustrating the configuration of a robotic processing automation system according to an embodiment of the disclosure.

FIG. 1 is a diagram illustrating the configuration of a robotic processing automation system according to an embodiment of the disclosure.

Referring to FIG. 1, a robotic processing automation system 100 includes a robotic processing automation apparatus 102 and a remote apparatus 104. The robotic processing automation system 100 may be used to automate a task performed by the remote apparatus 104, which is a remotely located apparatus, through the robotic processing automation apparatus 102.

The robotic processing automation apparatus 102 and the remote apparatus 104 are communicatively connected to each other via a communication network 150. In embodiments, the communication network 150 may include the Internet, one or more local area networks, wide area networks, cellular networks, mobile networks, other types of networks, or a combination of such networks.

The robotic processing automation apparatus 102 may be used to automatically execute a target program installed in the remote apparatus 104. Here, the target program is a program or application installed in the remote apparatus 104, and refers to a target that is automatically executed remotely by the robotic processing automation apparatus 102.

Figure 2:
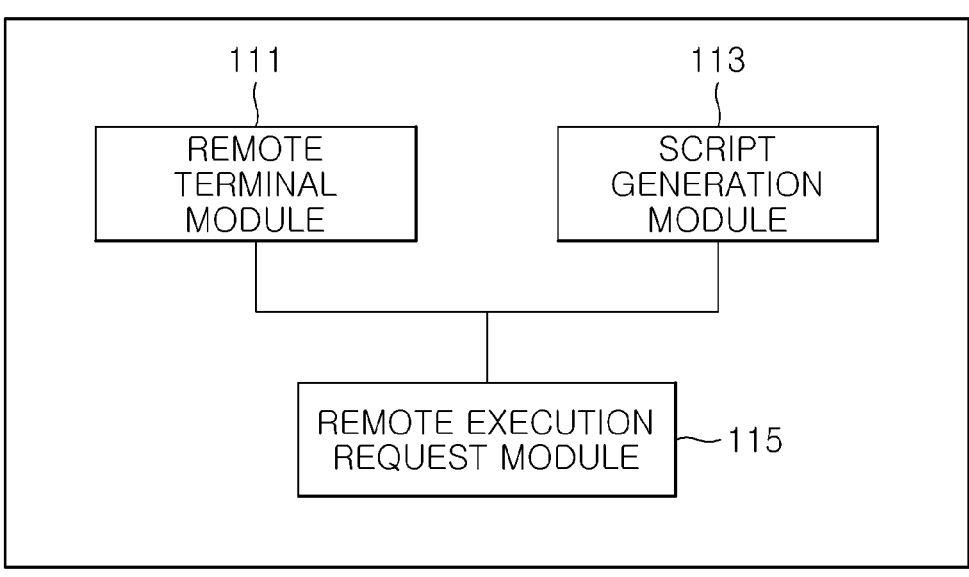
FIG. 2 is a block diagram illustrating the configuration of a robotic processing automation apparatus according to an embodiment of the disclosure.

FIG. 2 is a block diagram illustrating the configuration of the robotic processing automation apparatus 102 according to an embodiment of the disclosure.

Referring to FIG. 2, the robotic processing automation apparatus 102 may include a remote terminal module 111, a script generation module 113, and a remote execution request module 115. The robotic processing automation apparatus 102 or the modules 111 to 115 constituting the apparatus 102 may be implemented through a computing device shown in FIG. 7.

The remote terminal module 111 may transmit a screen stream request to the remote apparatus 104. The remote terminal module 111 may receive a screen stream from the remote apparatus 104. Here, the screen stream may be a screen of a target program to be executed in the remote apparatus 104. In this case, the screen stream may be obtained by converting the screen of the target program of the remote apparatus 104 into a video stream. The remote terminal module 111 may display a screen stream received from the remote apparatus 104 on the screen of the robotic processing automation apparatus 102.

In an exemplary embodiment, the remote terminal module 111 may include a remote terminal screen displayed on the screen of the robotic processing automation apparatus 102. The remote terminal module 111 may display the screen stream on the remote terminal screen. The remote terminal screen may have a screen configuration having a size smaller than that of the robotic processing automation apparatus 102. For example, the remote terminal screen may have a screen configuration such as a pop-up screen or a picture in picture (PIP), but is not limited thereto.

The script generation module 113 may generate an automation script for remote automation execution of the target program. The script generation module 113 may generate the automation script by transmitting an information inquiry request to the remote apparatus 104 according to the occurrence of a predetermined event and receiving object-related information corresponding to the information inquiry request from the remote apparatus 104.

Figure 3:
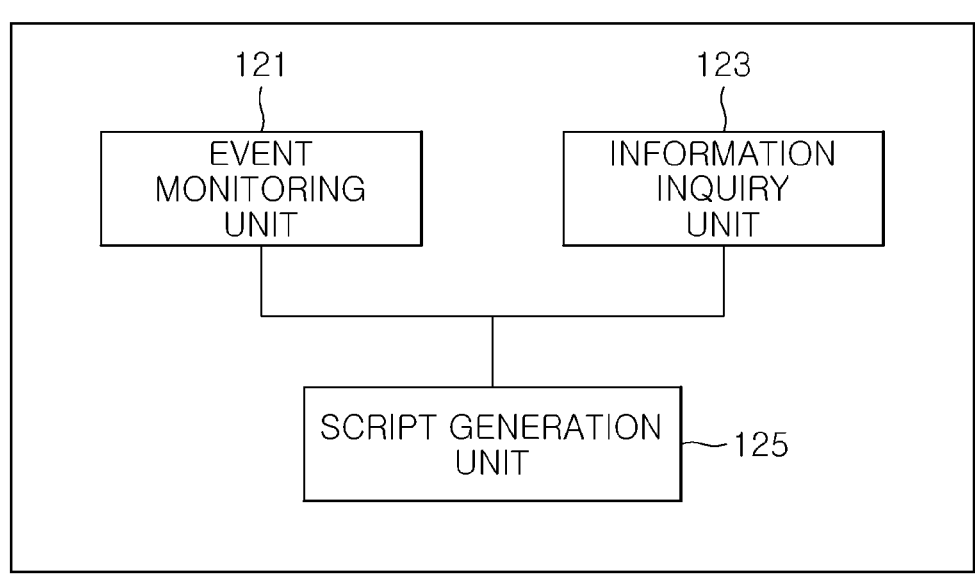
FIG. 3 is a block diagram illustrating the configuration of a script generation module according to an embodiment of the disclosure.

FIG. 3 is a block diagram illustrating the configuration of the script generation module 113 according to an embodiment of the disclosure. Referring to FIG. 3, the script generation module 113 may include an event monitoring unit 121, an information inquiry unit 123, and a script generation unit 125.

The event monitoring unit 121 may monitor whether the predetermined event by the user occurs in the screen stream displayed by the remote terminal module 111. In an exemplary embodiment, the event monitoring unit 121 may determine that the event has occurred when a user input occurs in the screen stream displayed by the remote terminal module 111. For example, when the user selects a specific object from the screen stream in a remote terminal screen through an input means such as a mouse or a keyboard, the event monitoring unit 121 may determine that the predetermined event has occurred.

The information inquiry unit 123 may transmit an information inquiry request for an object related to the corresponding event to the remote device 104 when the predetermined event occurs. In an exemplary embodiment, the information inquiry unit 123 may extract coordinate information of the object related to the event from the screen stream displayed by the remote terminal module 111, and may transmit the information inquiry request to the remote apparatus 104 based on the extracted coordinate information of the object.

The information inquiry unit 123 may firstly convert the coordinates of the object selected by the user on the screen of the robotic processing automation apparatus 102 into relative coordinates on the remote terminal screen, and may secondarily convert the firstly converted coordinates into coordinates on the screen of the remote apparatus 104 to transmit the secondarily converted coordinates to the remote apparatus 104.

Figure 4:
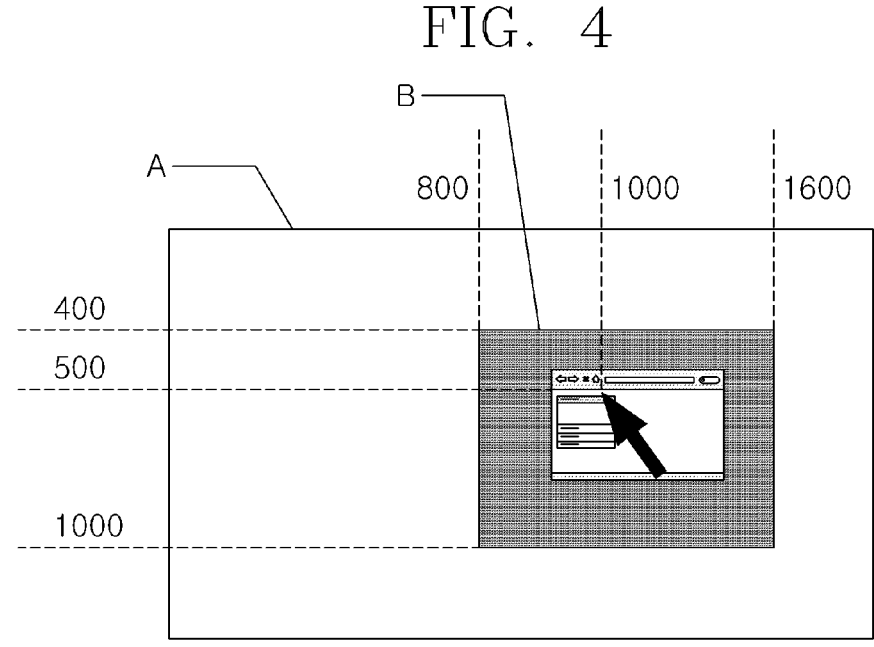
FIG. 4 is a diagram illustrating a state of converting coordinates between a screen of a robotic processing automation apparatus and a screen of a remote apparatus in an embodiment of the disclosure.

FIG. 4 is a diagram illustrating a state of converting coordinates between a screen of the robotic processing automation apparatus 102 and a screen of the remote apparatus 104 in an embodiment of the disclosure. In FIG. 4, the size (resolution) of a remote terminal screen B is illustrated as 800×600. It is assumed that the left upper and lower ends of the remote terminal screen B are located at coordinates (800,400) and (800,1000) on a screen A of the robotic processing automation apparatus 102, respectively, and the right upper and lower ends of the remote terminal screen B are located at coordinates (1600,400) and (1600,1000) on the screen A of the robotic processing automation apparatus 102, respectively.

Referring to FIG. 4, the information inquiry unit 123 may extract the coordinates of the object selected by the user from the screen A of the robotic processing automation apparatus 102. For example, when the coordinates of the object selected by the user are (1000,500) on the screen A of the robotic processing automation apparatus 102, the information inquiry unit 123 may convert the coordinates of the object into relative coordinates on the remote terminal screen B. The information inquiry unit 123 may firstly convert the coordinates (1000,500) on the screen A of the robotic processing automation apparatus 102 into (200,100), which are relative coordinates, on the remote terminal screen B.

In addition, the information inquiry unit 123 may secondarily convert the firstly converted coordinates into coordinates on a screen C of the remote apparatus 104. At this time, the information inquiry unit 123 may secondarily convert the firstly converted coordinates into the coordinates on the screen C of the remote apparatus 104 based on a ratio between the resolution of the screen C of the remote apparatus 104 and the resolution of the remote terminal screen B. For example, when the resolution of the screen C of the remote apparatus 104 is 1600×1200, the coordinates (200,100) on the remote terminal screen B may be converted into coordinates (400,200) on the screen C of the remote apparatus 104.

The script generation unit 125 may generate an automation script based on object-related information and a screen stream received from the remote apparatus 104 in response to an information inquiry request. Here, the object-related information may include detailed information on the object, such as object ID, object name, object type, object hierarchy, object image size, object location, and object URL. The script generation unit 125 may generate the automation script by combining the object-related information and the screen stream. The automation script may be a script for automatically executing a target program installed in the remote apparatus 104.

Referring again to FIG. 2, the remote execution request module 115 may transmit the remote execution request including the automation script to the remote apparatus 104. The remote execution request may be a request for execution of the automation script. For example, the remote execution request module 115 may transmit the remote execution request for the purpose of testing or actually executing the automation script. The remote execution request module 115 may receive an execution result according to the remote execution request from the remote apparatus 104.

The remote apparatus 104 may be a terminal located remotely from the robotic processing automation apparatus 102. The target program may be installed in the remote apparatus 104.

Figure 5:
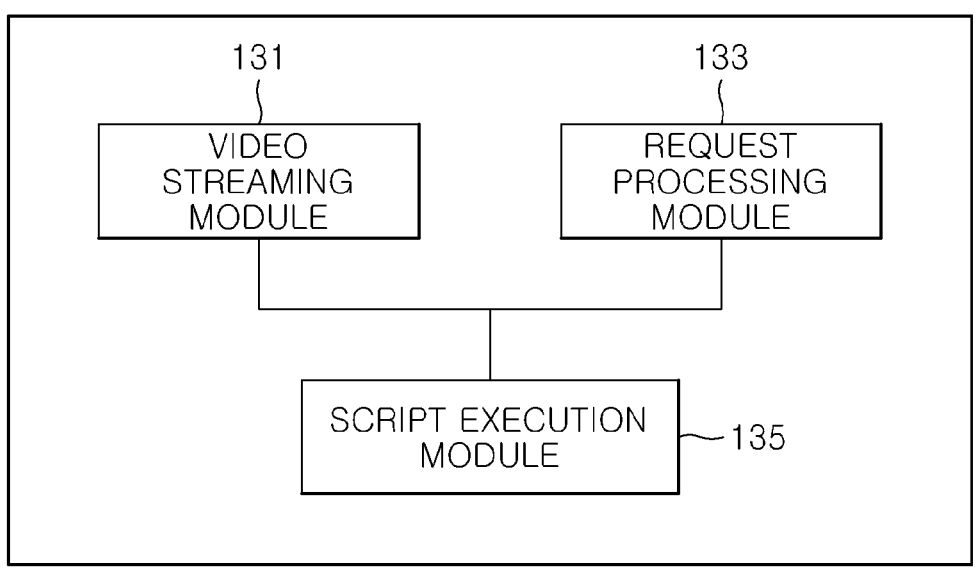
FIG. 5 is a block diagram illustrating the configuration of a remote apparatus according to an embodiment of the disclosure.

FIG. 5 is a block diagram illustrating the configuration of the remote apparatus 104 according to an embodiment of the disclosure.

Referring to FIG. 5, the remote apparatus 104 may include a video streaming module 131, a request processing module 133, and a script execution module 135. The remote apparatus 104 or the modules 131 to 135 constituting the apparatus 104 may be implemented through the computing device shown in FIG. 7.

The video streaming module 131 may receive a screen stream request from the robotic processing automation apparatus 102. When receiving the screen stream request, the video streaming module 131 may convert an execution screen of a target program executed in the remote apparatus 104 into a video stream, and may then transmit the converted screen stream to the robotic processing automation apparatus 102.

The request processing module 133 may receive an information inquiry request including coordinate information of a predetermined object from the robotic processing automation apparatus 102. The request processing module 133 may extract coordinate information of the object included in the information inquiry request, may detect the object corresponding to the coordinate information of the object on the screen of the remote apparatus 104, and may then extract object-related information on the object. For example, the request processing module 133 may obtain the object-related information from the target program executed in the remote apparatus 104.

The object-related information may include detailed information on the object, such as object ID, object name, object type, object hierarchy, object image size, object location, and object URL. The request processing module 133 may transmit the extracted object-related information to the robotic processing automation apparatus 102 in response to the information inquiry request.

For example, when the object corresponding to the coordinate information of the object on the screen of the remote apparatus 104 is a button image of the Internet Explorer browser, the request processing module 133 may extract detailed information on the object, such as Process: iexplorer, Type: button, Title: Google-Internet Explorer, Size: size of target button (587, 614, 111, 36), Position: position within target button (72, 26), Target URL: https://www-.google.com/?gws_rd=ssl#spf=1618992170043, HTML query: DIV:nth-of-type(3)>CENTER>INPUT:nth-of-type (1), etc., as the object-related information.

The request processing module 133 may receive a remote execution request from the robotic processing automation apparatus 102. The request processing module 133 may extract an automation script included in the remote execution request and may transmit the extracted automation script to the script execution module 135. The request processing module 133 may receive an execution result according to the remote execution request from the script execution module 135 and may transmit the received execution result to the robotic processing automation apparatus 102.

The script execution module 135 may execute the automation script included in the remote execution request in the remote apparatus 104. The script execution module 135 may transmit the execution result of the automation script to the robotic processing automation apparatus 102 through the request processing module 133.

Meanwhile, although it has been described herein that the request processing module 133 receives the remote execution request and transmits the automation script to the script execution module 135, the disclosure is not limited thereto. That is, the script execution module 135 may directly receive the remote execution request and may also directly transmit the execution result to the robotic processing automation apparatus 102.

According to the disclosed embodiment, object-related information on an object selected by the user in the screen stream received from the remote apparatus 104 may be received from the remote apparatus 104, and an automation script may be generated based on the received object-related information, whereby a program (or application) installed on the remote apparatus 104 can also develop an object information-based automation scenario, and the program installed on the remote apparatus 104 can be automated in the same way as controlling a program on a local computer.

In this specification, a "module" may mean a functional and structural combination of hardware for carrying out the technical idea of the disclosure and software for driving the hardware. For example, the "module" may mean a logical unit of a predetermined code and a hardware resource for executing the predetermined code, and does not necessarily mean a physically connected code or a single type of hardware.

Figure 6:
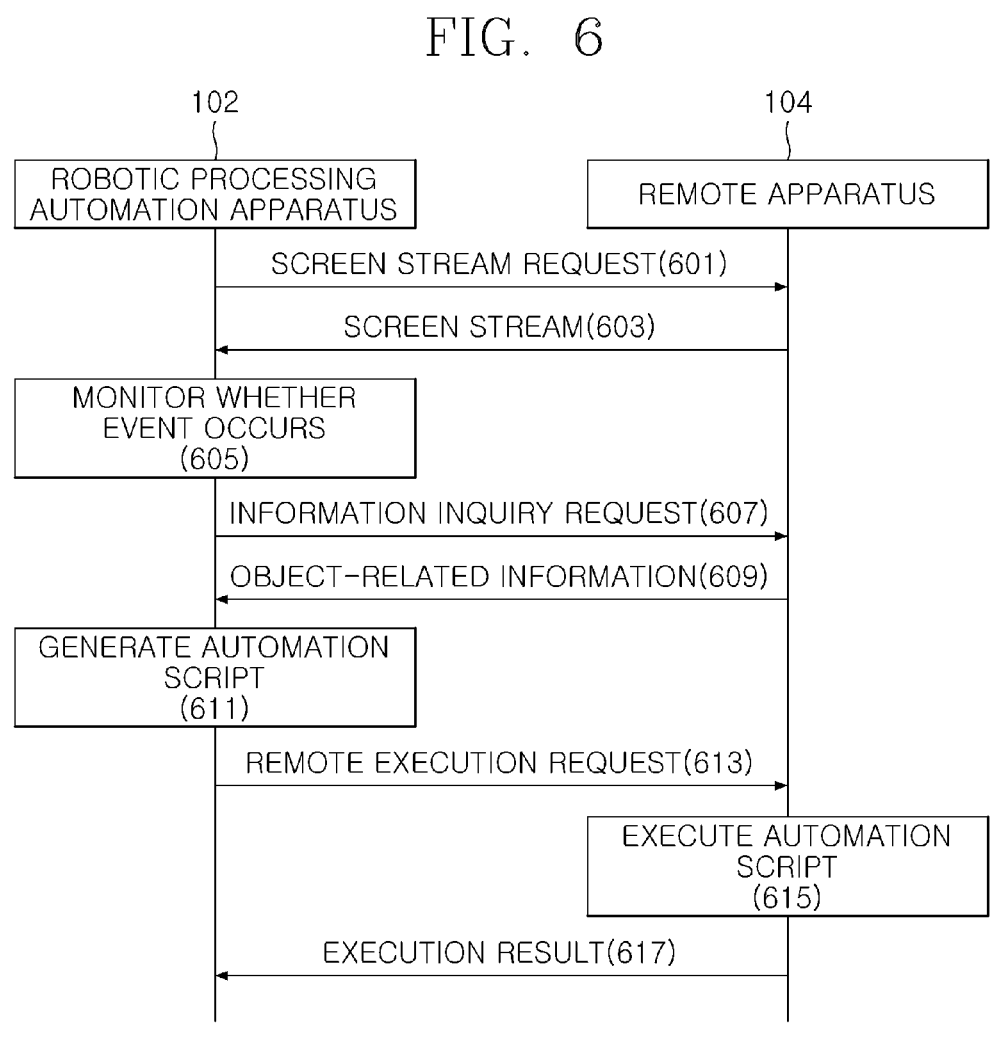

FIG. 6 is a flowchart illustrating a method for robotic processing automation according to an embodiment of the disclosure. The method for robotic processing automation may be performed by a signaling process between the robotic processing automation apparatus 102 and the remote apparatus 104. The method for robotic processing automation of the robotic processing automation apparatus 102 may be implemented through the computing device shown in FIG. 7. Similarly, the robotic processing automation method of the remote apparatus 104 may be implemented through the computing device shown in FIG. 7.

Referring to FIG. 6, in operation 601, the robotic processing automation apparatus 102 may transmit a screen stream request to the remote apparatus 104.

Next, in operation 603, the remote apparatus 104 may convert a screen of a target program executed in the remote apparatus 104 into a video stream, and may transmit the converted screen stream to the robotic processing automation apparatus 102.

Next, in operation 605, the robotic processing automation apparatus 102 may display the received screen stream on the screen, and may monitor whether a predetermined event occurs from the user.

Next, in operation 607, when an event occurs from the user, the robotic processing automation apparatus 102 may transmit an information inquiry request to the remote apparatus 104. In this case, the information inquiry request may include coordinate information of an object related to the event.

Next, in operation 609, the remote apparatus 104 may detect the object corresponding to the coordinate information of the object included in the information inquiry request, may extract object-related information on the object, and may transmit the extracted object-related information to the robotic processing automation apparatus 102.

Next, in operation 611, the robotic processing automation apparatus 102 may generate an automation script based on the received object-related information and the screen stream.

Next, in operation 613, the robotic processing automation apparatus 102 may transmit a remote execution request including the automation script to the remote apparatus 104.

Next, the remote apparatus 104 may execute the automation script included in the remote execution request in operation 615, and may transmit the execution result to the remote apparatus 104 in operation 617.

Here, the robotic processing automation apparatus 102 and the remote apparatus 104 may repeat this process to generate and test automation scripts, and may generate an automation scenario composed of the automation scripts.

Meanwhile, in the flowchart shown in FIG. 6, the method is divided into a plurality of operations and described, but at least some operations may be performed in a different order, may be performed in combination with other operations, may be omitted, or may be divided into detailed operations to be performed. Alternatively, at least some operation not shown may be added and performed.

FIG. 7 is a block diagram illustrating a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In an embodiment, the computing device 12 may be the above-described robotic processing automation apparatus 102 or at least one of the components constituting the robotic processing automation apparatus 102. In addition, the computing device 12 may be the above-described remote apparatus 104 or at least one of the components constituting the remote apparatus 104.

The computing device 12 includes at least one processor 14, a computer-readable storage medium 16, and a communication bus 18. The processor 14 may cause the computing device 12 to operate according to the exemplary embodiments discussed above. For example, the processor 14 may execute one or more programs stored in the computer-readable storage medium 16. The one or more programs may include one or more computer-executable instructions, and the computer-executable instruction may be configured, when executed by the processor 14, to cause the computing device 12 to perform operations according to the exemplary embodiment.

The computer-readable storage medium 16 is configured to store the computer-executable instructions or a program code, program data, and/or other suitable form of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or a suitable combination thereof), one or more magnetic disk storage devices, optical disk storage devices, flash memory devices, other forms of storage medium that can be accessed by the computing device 12 and store desired information, or a suitable combination thereof.

The communication bus 18 interconnects various other components of the computing device 12, while including the processor 14 and the computer-readable storage medium 16.

The computing device 12 may also include one or more input/output interfaces 22 and one or more network communication interfaces 26 that provide interfaces for one or more input/output devices 24. The input/output interface 22 and the network communication interface 26 are connected to the communication bus 18. The input/output device 24 may be connected to other components of the computing device 12 via the input/output interface 22. The exemplary input/output device 24 may include a pointing device (such as a mouse or trackpad), a keyboard, a touch input device (such as a touchpad or touchscreen), a voice or sound input device, various types of sensor devices and/or input devices such as imaging devices, and/or an output device such as a display device, a printer, a speaker and/or a network card. The exemplary input/output device 24 may be included in the computing device 12 as a component constituting the computing device 12, and may be connected to the computing device 12 as a separate device distinct from the computing device 12.

According to the disclosed embodiment, object-related information on an object selected by the user in the screen stream received from the remote apparatus may be received from the remote apparatus, and an automation script may be generated based on the received object-related information, whereby a program (or application) installed on the remote apparatus can also develop an object information-based automation scenario, and the program installed on the remote apparatus can be automated in the same way as controlling a program on a local computer.

Although representative embodiments of the disclosure have been described in detail above, those of ordinary skill in the art will understand that various modifications are possible without departing from the scope of the disclosure with respect to the above-described embodiments. Therefore, the scope of the disclosure should not be limited to the described embodiments, and should be defined by the claims described below as well as the claims and equivalents.

What is claimed is:

1. A robotic processing automation method that is performed in a computing device including one or more processors and a memory for storing one or more programs executed by the one or more processors, the robotic processing automation method comprising:

transmitting to a remote apparatus, a screen stream request for requesting a screen of the remote apparatus, the screen of the remote apparatus including an execution screen of a target program installed in the remote apparatus;

receiving from the remote apparatus, a screen stream corresponding to the screen stream request and displaying a screen of the computing device including a remote terminal screen, the remote terminal screen including the received screen stream;

monitoring whether a user event occurs in the screen stream displayed in the screen of the computing device;

transmitting to the remote apparatus, when the user event occurs, an information inquiry request for an object related to the user event, the information inquiry request including coordinate information of the object on the screen of the remote apparatus, the coordinate information of the object being obtained based on coordinates of the object on the screen of the computing device;

receiving from the remote apparatus, object-related information corresponding to the information inquiry request; and generating an automation script for automatically executing the target program based on the screen stream and the object-related information, wherein the obtaining the coordinate information of the object comprises:

extracting first coordinates of the object from the screen of the computing device;

converting the first coordinates of the object into second coordinates on the remote terminal screen based on a relative position between the screen of the computing device and the remote terminal screen; and converting the second coordinates into third coordinates on the screen of the remote apparatus using a resolution of the remote terminal screen and a resolution of the screen of the remote apparatus.

2. The robotic processing automation method of claim 1, wherein the displaying the screen stream corresponding to the screen stream request, comprises displaying the screen stream through the remote terminal screen in the screen of the computing device.

3. The robotic processing automation method of claim 2, wherein the monitoring comprises determining that the user event has occurred when there is a user input for selecting an object within the screen stream displayed on the remote terminal screen.

4. The robotic processing automation method of claim 3, further comprising:

inserting coordinate information on the selected object, into the information inquiry request.

5. The robotic processing automation method of claim 1, wherein the converting the second coordinates comprises converting the second coordinates into the third coordinates on the screen of the remote apparatus based on a ratio between the resolution of the remote terminal screen and the resolution of the screen of the remote apparatus.

6. The robotic processing automation method of claim 3, wherein the object-related information comprises at least one of an object ID, an object name, an object type, an object hierarchy, an object image size, an object location, or an object URL of the selected object.

7. The robotic processing automation method of claim 1, further comprising:

transmitting to the remote apparatus, a remote execution request including the automation script; and receiving from the remote apparatus, an execution result of the automation script.

8. The robotic processing automation method of claim 1, wherein the screen stream is obtained by converting a screen of the target program of the remote apparatus into a video stream.

9. A robotic processing automation apparatus comprising:

a processor, wherein the processor is configured to perform operations of:

transmitting to a remote apparatus, a screen stream request for requesting a screen of the remote apparatus, the screen of the remote apparatus including a screen of a target program installed in the remote apparatus, receiving from the remote apparatus, a screen stream corresponding to the screen stream request, and displaying a screen of the robotic processing automation apparatus including a remote terminal screen, the remote terminal screen including the received screen stream; and transmitting to the remote apparatus, when a user event occurs in the screen stream displayed in the screen of the robotic processing automation apparatus, an information inquiry request for an object related to the user event, receiving from the remote apparatus, object-related information corresponding to the information inquiry request, and generating an automation script for automatically executing the target program based on the screen stream and the object-related information, the information inquiry request including coordinate information of the object on the screen of the remote apparatus, the coordinate information of the object being obtained based on coordinates of the object on the screen of the robotic processing automation apparatus, wherein the operation of obtaining the coordinate information of the object comprises:

extracting first coordinates of the object from the screen of the robotic processing automation apparatus;

converting the first coordinates of the object into second coordinates on the remote terminal screen based on a relative position between the screen of the robotic processing automation apparatus and the remote terminal screen; and converting the second coordinates into third coordinates on the screen of the remote apparatus using a resolution of the remote terminal screen and a resolution of the screen of the remote apparatus.

10. The robotic processing automation apparatus of claim 9, wherein the operation of displaying the screen stream includes displaying the screen stream through the remote terminal screen in the screen of the robotic processing automation apparatus.

11. The robotic processing automation apparatus of claim 10, wherein the operation of generating the automation script includes determining that the user event has occurred when there is a user input for selecting an object within the screen stream displayed on the remote terminal screen.

12. The robotic processing automation apparatus of claim 11, wherein the operation of generating the automation script includes inserting coordinate information on the selected object into the information inquiry request.

13. The robotic processing automation apparatus of claim 9, wherein the operation of converting the second coordinates includes converting the second coordinates into the third coordinates on the screen of the remote apparatus based on a ratio between the resolution of the remote terminal screen and the resolution of the screen of the remote apparatus.

14. The robotic processing automation apparatus of claim 11, wherein the object-related information includes at least one of an object ID, an object name, an object type, an object hierarchy, an object image size, an object location, or an object URL of the object selected by the user input.

15. The robotic processing automation apparatus of claim 9, wherein the processor is further configured to perform an operation of:

transmitting to the remote apparatus, a remote execution request including the automation script, and receiving from the remote apparatus, an execution result of the automation script.

16. The robotic processing automation apparatus of claim 9, wherein the screen stream is obtained by converting the screen of the target program of the remote apparatus into a video stream.

17. A robotic processing automation system comprising:

a robotic processing automation apparatus configured to:

transmit a screen stream request for requesting a screen of a remote apparatus, the screen of the remote apparatus including an execution screen of a target program installed in the remote apparatus, receive a screen stream corresponding to the screen stream request and display a screen of the robotic processing automation apparatus including a remote terminal screen, the remote terminal screen including the received screen stream, transmit, when a user event occurs in the screen stream displayed in the screen of the robotic processing automation apparatus, an information inquiry request for an object related to the user event, the information inquiry request including coordinate information of the object on the screen of the remote apparatus, the coordinate information of the object being obtained based on coordinates of the object on the screen of the robotic processing automation apparatus, receive object-related information corresponding to the information inquiry request, and generate an automation script for automatically executing the target program based on the screen stream and the object-related information; and the remote apparatus configured to:

convert the execution screen of the target program into a video stream in response to the screen stream request and transmit the converted screen stream to the robotic processing automation apparatus, receive the information inquiry request to detect an object corresponding to the information inquiry request, and extract object-related information on the object to transmit the extracted object-related information to the robotic processing automation apparatus, wherein the robotic processing automation apparatus is further configured to:

extract first coordinates of the object from the screen of the robotic processing automation apparatus;

convert the first coordinates of the object into second coordinates on the remote terminal screen based on a relative position between the screen of the robotic processing automation apparatus and the remote terminal screen; and convert the second coordinates into third coordinates on the screen of the remote apparatus using a resolution of the remote terminal screen and a resolution of the screen of the remote apparatus.

18. The robotic processing automation system of claim 17, wherein the robotic processing automation apparatus is configured to transmit to the remote apparatus, a remote execution request including the automation script, and receive from the remote apparatus, an execution result of the automation script.

* * * * *